Nov. 13, 1962     P. J. LONG, JR     3,063,702
COMBINED SHOCK ABSORBER AND AIR SPRING UNIT ASSEMBLY
Filed Aug. 30, 1960     2 Sheets-Sheet 1

INVENTOR.
Paul J. Long, Jr.
BY
His Attorney

INVENTOR.
Paul J. Long, Jr.
BY
His Attorney

3,063,702
Patented Nov. 13, 1962

3,063,702
COMBINED SHOCK ABSORBER AND AIR SPRING UNIT ASSEMBLY
Paul J. Long, Jr., Dayton, Ohio, assignor to General Motors Corporation, Detroit, Mich., a corporation of Delaware
Filed Aug. 30, 1960, Ser. No. 52,882
10 Claims. (Cl. 267—64)

This invention relates to a combination shock absorber and supplementary air spring unit assembly that is adapted to be placed between the sprung mass and the unsprung mass of a vehicle in the same position a conventional direct acting tubular type shock absorber is normally disposed adjacent the main suspension spring for the vehicle, the supplementary air spring unit that is carried by the shock absorber, when pressurized with a fluid pressure such as air, being adapted to aid the main suspension spring in support of the sprung mass of the vehicle on the unsprung mass.

The combination shock absorber and supplementary air spring unit of this invention may be positioned adjacent each of the respective main suspension springs for the vehicle, if desired, but the combination units are used primarily adjacent the two rear suspension springs for the vehicle to allow the supplementary air spring units, when pressurized, to aid the main suspension springs in resilient support of the sprung mass on the unsprung mass of the vehicle. The combination shock absorber and air spring unit is connected between the sprung mass and the unsprung mass of the vehicle in the same manner that a sprung mass of the vehicle in the same manner that a normal direct acting tubular type shock absorber is connected between the sprung mass and the unsprung mass of a vehicle normally positioned adjacent a main suspension spring to damp movements between the sprung mass and the unsprung mass of the vehicle. The supplementary air spring unit is positioned around the shock absorber and is suitably connected between the body and the rod that reciprocates relative to the body so that the air spring unit when pressurized with a suitable gas, such as air, will be effective as an added resilient spring operating in parallel with the main suspension spring to aid the main suspension spring in support of the sprung mass on the unsprung mass of the vehicle.

Normally the air spring unit of the combination shock absorber and air spring unit is depressurized, or exhausted, that is normally the pressure internally of the air spring unit when it is not effective as a supplementary air spring is substantially atmosphere. Under this condition the air spring unit has substantially no effect on the spring suspension for the vehicle so that there will be no substantial change in ride effect that is normally engineered into the spring suspension for the vehicle. However, when the load is carried by the vehicle which would tend to make the rear end of the vehicle sag below a normal condition, the supplementary air spring units can be pressurized with a gas under pressure, such as air, to offset the increase in load in the vehicle and thereby resist bottoming of the vehicle by the added spring suspension effect and maintain the vehicle in a level condition relative to the load.

One of the problems in producing a combination shock absorber and supplementary air spring unit that can be used in the same position as a conventional direct acting shock absorber is that of space requirement which is at a premium in many instances. Therefore the combination unit shall be constructed and arranged in a manner that it will not take up any great amount of space over and above that which would be taken up by a conventional direct acting shock absorber.

To accomplish the purpose of holding down the space requirement for the combination unit, it is proposed that the supplementary air spring unit shall be constructed in the form of a resilient flexible walled device having the form of a double walled tube provided with inner and outer walls connected by a return bend portion at one end. Such a wall structure for the air spring unit allows the free ends of the double walled tubular structure to be attached to the body of the shock absorber and to a member carried by the reciprocating rod of the shock absorber and provide a pressure receiving chamber closed at one end by the flexible resilient double walled structure, the tubular double walled structure being substantially coaxial with the shock absorber and thereby taking up a minimum of space requirement.

However, in constructing an auxiliary air spring unit of the type just mentioned it has been found that when the double walled flexible tubular structure is reciprocated under conditions of deflation of the air receiving chamber of the air spring unit that the outer wall of the structure tends to collapse upon the inner wall so that the outer wall needs support in its reciprocal movement relative to the body of the shock absorber. Also this has created a problem of abrasion of the outer wall over the means that attaches the inner wall to the body of the shock absorber so that protection from this abrasion is also required.

It is therefore an object of this invention to provide a combination shock absorber and supplementary air spring unit wherein at least a part of the walls of the air receiving chamber of the air spring unit are constructed of flexible tubular wall portions that are connected by a return bend portion, and wherein the inner wall of the flexible tubular wall structure is supported on the body of the shock absorber, that is the reservoir tube, and is attached to the body or reservoir tube by a fastening device that is also adapted to support the outer wall of the tubular flexible wall structure during the reciprocable stroke of operation of the shock absorber, the attachment means for the inner wall of the flexible tubular wall structure being constructed and arranged in a manner to substantially eliminate abrasion of the outer wall as it passes over the attaching means.

Further objects and advantages of the present invention will be apparent from the following description reference being had to the accompanying drawings, wherein a preferred embodiment of the present invention is clearly shown.

Figure 1:
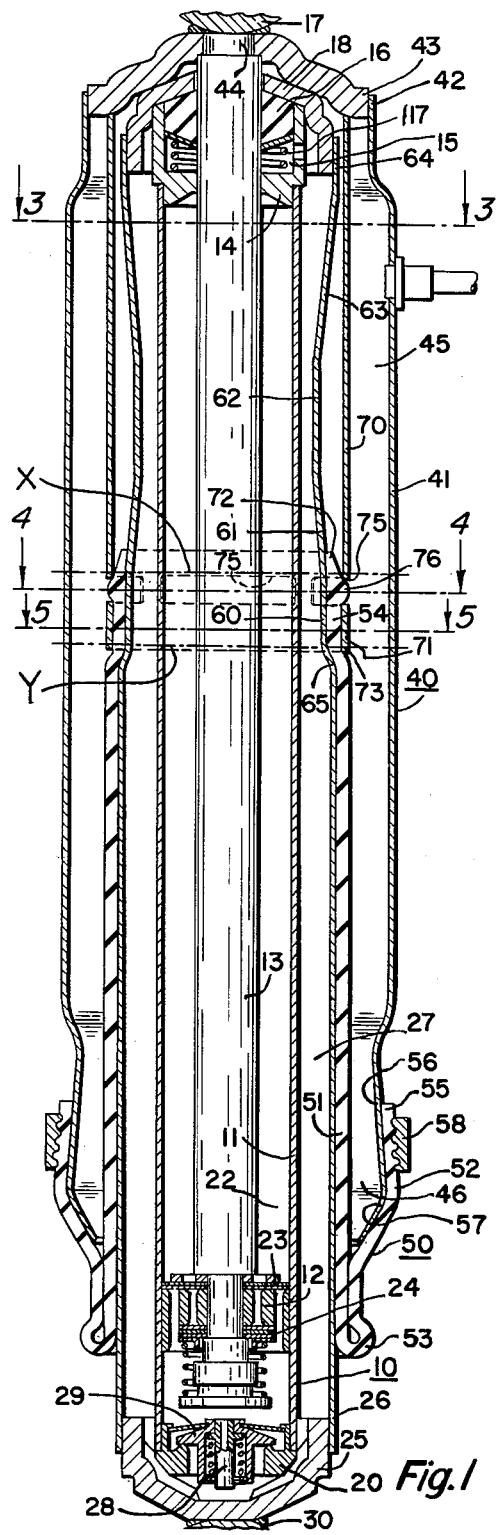
FIGURE 1 is a longitudinal cross-sectional view of a combination shock absorber and supplementary air spring unit incorporating features of this invention.

In this invention, in FIGURE 1 there is illustrated a combination shock absorber and supplementary air spring unit assembly that is adapted to be placed between the sprung mass and the unsprung mass of a vehicle in the same location that a conventional direct acting tubular shock absorber normally occupies adjacent the main suspension spring of the vehicle. The shock absorber will function in its normal manner to damp movements between the sprung mass and the unsprung mass without any substantial interference from the air spring unit of the assembly when the air spring is not pressurized. When the air spring unit of the combination assembly is pressurized, the air spring will aid support of the sprung mass on the unsprung mass of the vehicle since it functions in parallel with the main suspension spring. The pressure of the fluid supplied to the air spring can be proportioned to the load that is carried by the vehicle to reduce rear end sagging of the vehicle and to position it level relative to the road.

The shock absorber 10 consists of a pressure cylinder 11 having a valved piston 12 carried on the end of a reciprocating rod 13. The reciprocating rod 13 extends through a rod guide member 14 having a rod seal chamber 15 that receives a rod seal 16 engaging the rod and sealing against loss of hydraulic fluid from within the shock absorber 11. The projecting end of the rod 13 carries a fitting 17 adapted for attachment to the sprung mass or chassis frame of the vehicle to attach this end of the shock absorber to the vehicle. The seal chamber 15 is closed by a cap member 18 that also holds the rod seal 16 within the chamber 15, a compression spring 117 holding the rod seal 16 under compression pressure. The bottom end of the cylinder 11 is closed by a base valve structure 20 so that a compression chamber 21 is formed between the base valve 20 and the piston 12. A rebound chamber 22 is formed between the piston 12 and the rod guide 14.

The piston 12 is provided with a compression control valve 23 on one side of the piston to regulate flow of hydraulic fluid from the chamber 21 into the chamber 22 on movement of the piston 12 toward the base valve 20. On the opposite side of the piston 12 there is provided the rebound control valve 24 that controls flow of hydraulic fluid from chamber 22 into the chamber 21 when the piston moves upwardly away from the base valve 20. The base valve 20 is carried in a closure cap 25 that is secured within one end of a reservoir tube 26 surrounding and spaced from the cylinder tube 11. The upper end of the reservoir tube 26 is fixedly attached to the closure cap 18, thereby providing a closed fluid reservoir space 27 between the pressure cylinder tube 11 and the reservoir tube 26, the reservoir tube forms the exterior shell of the shock absorber assembly.

The base valve 20 has a valve member 28 that controls flow of hydraulic fluid from the compression chamber 21 into the reservoir chamber 27 on movement of the piston 12 toward the base valve 20. The base valve also includes a valve member 29 that provides for relatively free flow of hydraulic fluid from the reservoir chamber 27 back into the compression chamber 21 on movement of the piston 12 away from the base valve. The closure cap 25 carries a fitting 30 adapted for attachment of the lower end of the shock absorber to the unsprung mass or wheel and axle structure of the vehicle. The fitting members 30 and 17 thereby provide for attachment of the shock absorber and the air spring unit that is a part thereof hereinafter described between the sprung mass and the unsprung mass of the vehicle, in which condition the shock absorber 10 can function normally to provide for damping of relative movement between the sprung mass and the unsprung mass of the vehicle, in which process the rod 13 reciprocates into and out of the pressure cylinder 11.

The air spring unit assembly 40 of the combination structure includes a rigid tubular wall 41 that is concentric with the reservoir tube 26 and spaced therefrom, as shown in FIGURE 1. The upper end 42 of the tubular member 41 is fixedly secured to the cap member 43 that in turn is fixedly secured on the extending end 44 of the reciprocating rod 13, the joints between the cap 43 and the rod 44 as well as the end 42 of the tube 41 being fluid tight connections so as to form a pressure receiving chamber 45 between the additional tube 41 and the reservoir tube 26, the chamber having an open bottom end 46.

The air spring unit assembly 40 includes a resilient flexible double walled tubular structure 50 having an inner wall portion 51 and an outer wall portion 52 that are connected by a return bend portion 53 formed from the inner and outer wall portions as the relative reciprocation occurs between the two wall portions 51 and 52 in a manner hereinafter described.

The tubular inner wall portion 51 of the flexible double walled tubular structure 50 has a free end portion 54 that is attached to the reservoir tube 26 while the outer wall portion 52 has a free end portion 55 that is attached to the lower end portion 56 of the tubular member 41. The lower end portion 56 of the tube 41 has the terminus end 57 thereof turned inwardly toward the reservoir tube 26 and the inner wall 51 to prevent the outer wall from working upwardly between the bottom end of the tube 41.

The free end portion 55 of the structure 50 is sleeved over the end wall 56 that is in the form of a truncated cone, a non-expansible metal band 58 securing the end wall portion 55 on the end portion 56 of the tube 41. The inner diameter of the ring 58 is less than the maximum diameter of the wall portion 56 plus twice the thickness of the wall 55 in the relaxed condition so that any movement of the wall end 55 axially downwardly tends to tighten the friction engagement between the several parts held by the ring 58 in proportion to the pressure applied in the pressure receiving chamber 45.

The reservoir tube 26 has a reduced diameter cylindrical portion 60 that is just slightly less in diameter than the external diameter of the tube 26. This cylindrical portion 60 is coaxial with the axis of the shock absorber which is also the axis for the reservoir tube 26 so that from an annular line X to an annular line Y the reduced diameter portion 60 of the reservoir tube 26 is a true cylinder. From the upper end of the cylindrical wall portion 60 there extends an annular axially extending wall surface or wall portion 61 that has its diameter continuously diminishing as it progresses away from the annular line X forming the juncture between the wall portion 61 and the wall portion 60. Actually, the wall portion 61 is in the form of a truncated cone with the base forming the juncture between the wall portion 60 and the wall portion 61 along the annular line X. This annular wall portion 61 recedes to a minimum diameter wall portion 62 and then increases its diameter in the wall portion 63 to the full diameter of the reservoir tube at the end portion 64 thereof, by attachment to the cap member 18 in the manner heretofore described. Thus the wall portions 61, 62 and 63 form a recessed annulus in the upper portion of the reservoir tube 26 that has a lesser diameter than the main portion of the reservoir tube.

The lower end of the cylindrical wall portion 60 of the reservoir tube 26 has a shoulder wall portion 65 that is of continuously increasing diameter relative to the wall portion 60 as the wall portion 65 progresses away from the annular line Y which forms the juncture between the wall portions 60 and 65. The wall portion 65 terminates at maximum diameter in the same diameter as the main portion of the reservoir tube 26.

The inner flexible tubular wall 51 of the double walled tubular structure 50 has its free end portion 54 sleeved over the shoulder portion 65, the cylindrical portion 60 and the reduced diameter portion 61 on assembly of the inner wall 51 on the reservoir tube 26 when it is sleeved onto the reservoir tube.

To frictionally secure the end wall portion 54 of the wall 51 to the reservoir tube 26, there is provided a cylinder sleeve 70 positioned between the reservoir tube 26 and the additional tube 41 that is coaxial with these members. The lower end of the cylindrical sleeve 70 forms an attaching ring 71 by its engagement with the free end portion 54 of the wall 51 to compressibly retain the wall 54 between a non-expansible sleeve ring 71 and the cylindrical portion 60 of the reservoir tube 26.

In assembly of the cylinder sleeve 70 onto the end wall portion 54, the cylinder is slipped downwardly over the end wall portion 54, the terminus end 72 of the wall portion 54 resting on the diminishing diameter or truncated cone portion 61 of the reservoir tube 26 so that the lower end 73 of the sleeve 70 can easily pass over the end of the wall portion 54 and then be slipped downwardly over the wall portion 54 to the position shown in FIGURE 1 with the annular terminus end 73 immediately adjacent the enlarging shoulder portion 65 of the reservoir tube 26.

With the annular terminus end portion 73 being positioned adjacent the enlarging shoulder portion 65, the interference fit relationship between the ring end portion of the sleeve 70 and the shoulder 65, with the compressive wall portion 54 therebetween is such that axial movement of the inner wall 51 downwardly toward the base valve end of the shock absorber is prevented by the retaining ring 71, additional compression being applied to the wall 54 by any tendency of such axial movement of the wall 51. Also, since the walls 71 and 60 are both true cylinders, the sleeve 70 will not tend to creep upwardly off the wall end 54.

The cylinder sleeve 70 is provided with a plurality of transversely extending openings 75 through which the wall portion 54 projects by the projection 76 resulting from the relief of compression in the wall 54 in the area of the opening 75, the sleeve 70 being thereby locked onto the end wall portion 54 of the inner wall 51.

Figure 2:
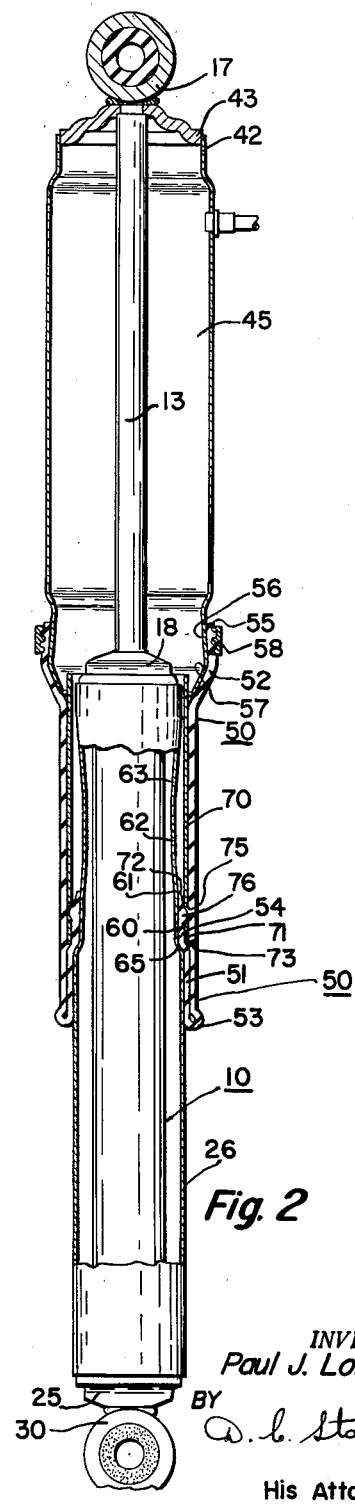
FIGURE 2 is a partial elevation and partial cross-sectional view of the shock absorber shown in FIGURE 1, but with the shock absorber being positioned in the fully extended position.
Figure 3:
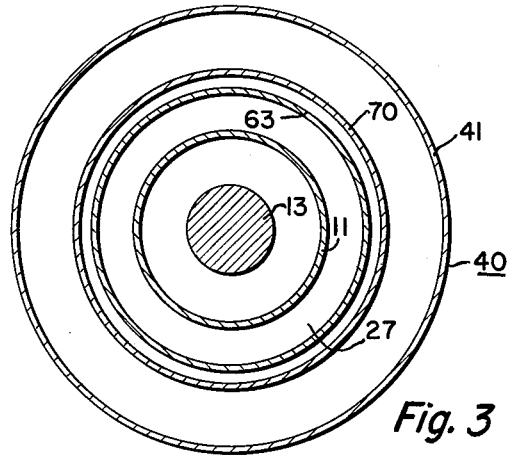
FIGURE 3 is a transverse cross-sectional view taken along line 3—3 of FIGURE 1.
Figure 4:
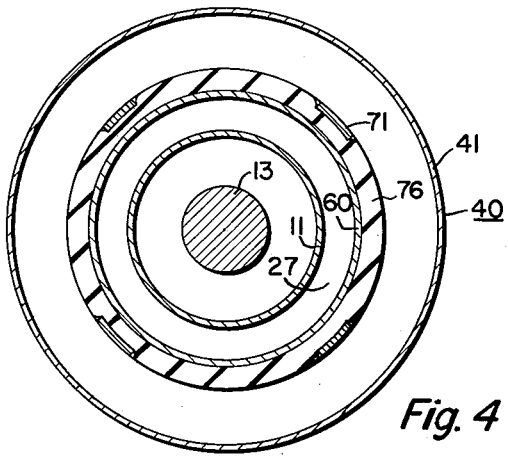
FIGURE 4 is a transverse cross-sectional view taken along line 4—4 of FIGURE 1.
Figure 5:
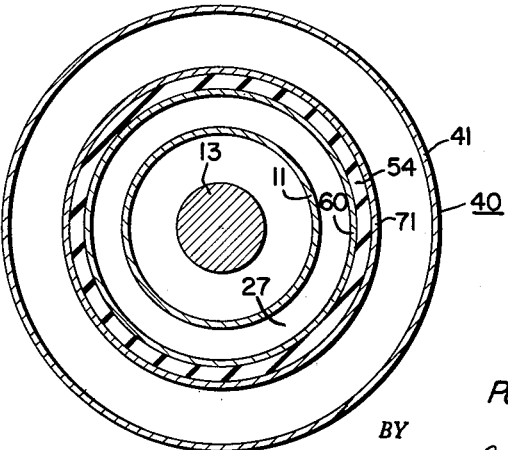
FIGURE 5 is a transverse cross-sectional view taken along line 5—5 of FIGURE 1.

As shown in FIGURE 1 the cylinder sleeve 70 extends axially toward the rod seal end of the shock absorber to a position substantially in engagement with the end wall of the tubular member 41, that is into engagement with the cap 43 that closes the end of the tubular member 41. It will also be noted from FIGURE 2 that the cylinder sleeve 71 extends toward the rod end of the shock absorber an extent that is at least equal to the position of the free end of the additional tubular wall member but relative to the rod receiving end of the shock absorber when the rod is in fully extended position, as shown in FIGURE 2. Therefore, the outer flexible wall 52 of the flexible tubular wall structure 50 is supported at the lower end of its reciprocal movement relative to the reservoir tube 26 by the inner wall 51, and then as the end portion 57 of the tubular wall 41 passes by the attachment of the inner wall end 54 to the reservoir tube 26, the support of the outer wall 52 is then transferred to the cylinder sleeve 70 for the remaining part of the reciprocal stroke of movement of the rod and the tube 41 to the full extended position as shown in FIGURE 2.

Since the cylinder sleeve 70 is a true cylinder, and is a relatively thin metal sleeve, obviously there is no substantial projection that will be engaged by the inner surface of the outer wall 52 when it passes over the attachment for the end wall portion 54 of the inner wall 51 and thereby relieving abrasion to the wall surface of the outer wall 52.

On the compression stroke of the shock absorber from the position shown in FIGURE 2 to the position shown in FIGURE 1, the outer wall 52 would tend to creep or bind between the lower end 57 of the tubular wall 51 were it not for inwardly turned portion 57 that is closely adjacent the cylinder sleeve 70 when the shock absorber is in the fully extended position and is closely adjacent the inner wall 51 when the shock absorber is in the fully compressed position.

To relieve abrasive action between the inner and outer walls on their relative movements during reciprocation of the rod 13 and the tube 41, a silicon lubricant or other satisfactory lubricant can be placed within the fluid pressure receiving chamber 45 to lubricate the surfaces in their reciprocal movement.

While the embodiment of the invention as herein disclosed constitutes a preferred form, it is to be understood that other forms might be adopted.

What is claimed is as follows:

1. A shock absorber and air spring unit assembly, including in combination, a direct acting tubular shock absorber having a tubular exterior shell closed at opposite ends thereof, and from one end of which there extends an operating rod for reciprocation through the said one end, a tubular flexible wall structure having an inner tubular wall portion and an outer tubular wall portion integrally connected at one end by a return bend portion formed by the inner and outer wall portions on relative reciprocation therebetween, said inner wall portion having a free end portion thereof attached to said exterior shell, said outer wall portion having a free end thereof attached to a tubular wall member secured on the projecting end of said rod and reciprocable therewith, and means attaching each of said free end portions to said shell and said member respectively at least one of which attaching means comprises an annular axially extending cylindrical wall surface from one end of which there extends an annular axially extending wall surface of lesser diameter than said cylindrical wall surface and from the opposite end of which there extends a shoulder means of greater diameter than said cylindrical wall surface, the respective free end of said tubular flexible wall structure being sleeved on said cylindrical wall surface, and a non-expansible ring positioned on the exterior of said respective free end of said tubular flexible wall structure coaxial with said cylindrical surface and having an inner diameter that is less than the diameter of said cylindrical surface plus twice the thickness of the flexible wall engaged thereby when in relaxed condition.

2. A shock absorber and air spring unit assembly constructed and arranged in accordance with that set forth in claim 1 wherein the said wall surface that extends from the said one end of said cylindrical wall surface has a continuously decreasing diameter relative to said cylindrical wall surface as the said lesser diameter surface progresses axially away from the said cylindrical wall surface, and wherein the said shoulder means is of continuously increasing greater diameter relative to the said cylindrical wall surface as the said shoulder means progresses axially away from the said cylindrical wall surface.

3. A shock absorber and air spring unit assembly constructed and arranged in accordance with claim 1 wherein the said annular surface that extends from the said one end of said cylindrical wall surface is in the form of a truncated cone with the base thereof forming a juncture with said cylindrical wall surface.

4. A shock absorber and air spring unit assembly constructed and arranged in accordance with that set forth in claim 1 wherein the said cylindrical wall surface is on said exterior shell of the shock absorber and is of a diameter less than the external diameter of the said shell.

5. A shock absorber and air spring unit assembly constructed and arranged in accordance with claim 1 wherein said ring is provided with opening means therein aligned radially with said cylindrical wall into which the said flexible wall engaged thereby expandingly protrudes for locking of the said ring on the said free end portion of said flexible tubular wall structure.

6. A shock absorber and air spring unit assembly, including in combination, a direct acting tubular shock absorber having a tubular exterior shell closed at opposite ends thereof and from one end of which there extends an operating rod for reciprocation through the said one end, a tubular flexible wall structure having an inner tubular wall portion and an outer tubular wall portion integrally connected at one end by a return bend portion formed by the inner and outer wall portions on relative reciprocation therebetween, said inner wall portion having a free end portion thereof attached to said exterior shell, said outer wall portion having a free end portion thereof attached to the free end portion of an additional tubular wall member secured on the projecting end of said rod and reciprocable therewith and surrounding the shock absorber in spaced relation thereto, and a tubular rigid cylindrical sleeve having an exterior surface generally coaxial with the exterior surface of the inner tubular wall portion of said tubular flexible wall structure disposed axially between said tubular exterior shell of the shock absorber and said additional tubular wall member one end of which sleeve engagingly encircles and retains said free end portion of said inner wall on said tubular exterior shell of the shock absorber with the opposite end of said sleeve extending axially toward the rod receiving end of the shock absorber an extent such as to position the said opposite end of said sleeve adjacent said free end of said additional tubular wall member when the said rod is in fully extended position to support thereby said outer wall by said inner wall and by said cylinder sleeve alternately during reciprocable movement of the outer wall relative to said exterior shell of the shock absorber.

7. A shock absorber and air spring unit assembly, including in combination, a direct acting tubular shock absorber having a tubular exterior shell closed at opposite ends thereof and from one end of which there extends an operating rod for reciprocation through the said one end, a tubular flexible wall structure having an inner tubular wall portion and an outer tubular wall portion integrally connected at one end by a return bend portion formed by the inner and outer wall portions on relative reciprocation therebetween, said inner wall portion having a free end portion thereof attached to said exterior shell, said outer wall portion having a free end portion thereof attached to the free end portion of an additional tubular wall member secured on the projecting end of said rod and reciprocable therewith and surrounding the shock absorber in spaced relation thereto, and a tubular rigid cylindrical sleeve having an exterior surface generally coaxial with the exterior surface of the inner tubular wall portion of said tubular flexible wall structure disposed axially between said tubular exterior shell of the shock absorber and said additional tubular wall member one end of which sleeve engagingly encircles and retains said free end portion of said inner wall on said tubular exterior shell of the shock absorber and the opposite end of which extends axially toward the rod receiving end of the shock absorber substantially into engagement with the attachment end of said additional tubular wall member to said rod to support thereby said outer wall by said inner wall and by said cylinder sleeve alternatively during reciprocable movement of said outer wall relative to said exterior shell of the shock absorber.

8. A shock absorber and air spring unit assembly constructed and arranged in accordance with that set forth in claim 6 wherein the said one end of said cylinder sleeve has an inner diameter that is less than the diameter of said cylindrical surface on said exterior shell of the shock absorber plus twice the thickness of the flexible wall engaged thereby when in relaxed condition whereby to provide compressive friction retention of the free end of the said inner wall on the said cylinder surface supporting the same.

9. A shock absorber and air spring unit assembly constructed and arranged in accordance with that set forth in claim 6 wherein the said one end of said cylinder sleeve is provided with opening means therein through which said free end of said inner wall expansively projects to lock said cylinder sleeve in position on said free end of said inner wall.

10. A shock absorber and air spring unit assembly constructed and arranged in accordance with that set forth in claim 6 wherein said cylinder sleeve extends in the axial direction toward the rod receiving end of the shock absorber at a uniform diameter substantially into engagement with the attachment end of said additional tubular wall member to said rod.

References Cited in the file of this patent

UNITED STATES PATENTS

| 1,047,962 | Marion | Dec. 24, 1912 |
| 2,916,296 | Muller | Dec. 8, 1959 |
| 2,925,265 | Nassimbene | Feb. 16, 1960 |

FOREIGN PATENTS

| 214,922 | Australia | May 2, 1958 |
| 218,802 | Australia | Nov. 21, 1958 |